United States Patent
Pineda Amo

(10) Patent No.: US 11,933,270 B2
(45) Date of Patent: Mar. 19, 2024

(54) WIND TURBINE SETPOINT REDUCTION

(71) Applicant: General Electric Renovables Espana, S.L., Barcelona (ES)

(72) Inventor: Isaac Pineda Amo, Barcelona (ES)

(73) Assignee: General Electric Renovables Espana, S.L., Barcelona (ES)

(*) Notice: Subject to any disclaimer, the term of this patent is extended or adjusted under 35 U.S.C. 154(b) by 0 days.

(21) Appl. No.: 17/689,303

(22) Filed: Mar. 8, 2022

(65) Prior Publication Data
US 2022/0290652 A1   Sep. 15, 2022

(30) Foreign Application Priority Data
Mar. 9, 2021   (EP) .................................... 21382193

(51) Int. Cl.
F03D 17/00 (2016.01)
F03D 7/02 (2006.01)

(52) U.S. Cl.
CPC ............. *F03D 17/00* (2016.05); *F03D 7/028* (2013.01); *F05B 2270/332* (2013.01); *F05B 2270/335* (2013.01)

(58) Field of Classification Search
CPC ................ F03D 7/028; F05B 2270/332; F05B 2270/335
See application file for complete search history.

(56) References Cited

U.S. PATENT DOCUMENTS

| | | | |
|---|---|---|---|
| 8,022,565 B2 | 9/2011 | Scholte-Wassink et al. | |
| 8,569,904 B2 | 10/2013 | Gundtoft et al. | |
| 9,127,642 B2 | 9/2015 | Zhu et al. | |
| 9,394,884 B2 | 7/2016 | Laurberg | |
| 9,605,653 B2 | 3/2017 | Barker et al. | |
| 2008/0148827 A1* | 6/2008 | Keski-Hynnila | G01M 15/05 73/114.74 |
| 2013/0085614 A1* | 4/2013 | Wenzel | G05B 13/021 700/277 |
| 2016/0341179 A1 | 11/2016 | Klodowski et al. | |

FOREIGN PATENT DOCUMENTS

WO   WO2021/004591 A1   1/2021

OTHER PUBLICATIONS

European Search Report Corresponding to EP21382193.7 dated Sep. 2, 2021.

* cited by examiner

*Primary Examiner* — Tulsidas C Patel
*Assistant Examiner* — Thomas K Quigley
(74) *Attorney, Agent, or Firm* — Dority & Manning, P.A.

(57) ABSTRACT

The present disclosure relates to methods for determining a maximum power setpoint for a wind turbine comprising determining a temperature of one or more wind turbine components, and determining one or more component temperature errors by determining a difference between the temperatures of the wind turbine components and a corresponding threshold temperature for the components. The methods further comprise determining a present power output of the wind turbine and determining the maximum power setpoint at least partially based at least on the component temperature errors, and on a present power output of the wind turbine. The present disclosure further relates to methods for determining a setpoint reduction and to wind turbine control systems and wind turbines configured for such methods.

17 Claims, 5 Drawing Sheets

WIND TURBINE SETPOINT REDUCTION

The present disclosure relates to wind turbines, in particular to setpoint reduction and methods for determining a maximum power setpoint based on temperatures of wind turbine components.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

In variable speed wind turbines, a wind turbine controller can change control settings of the wind turbine to adapt to varying wind conditions. In particular, pitch angles of the blades and generator torque may be varied to adapt to the wind conditions. At wind speeds below the nominal or "rated" wind speed, the control objective is generally to maximize electrical power output of the wind turbine i.e. pitch and generator torque are varied such that maximum electrical power output can be delivered to the grid. Above the nominal wind speed (and depending on the circumstances around the nominal wind speed), the control objective may be particularly to keep loads under control i.e. pitch and generator torque are varied to reduce the loads on the wind turbine to acceptable levels, while the power output is maintained at the highest possible level (given the constraint on the loads).

Wind turbines may be used in widely different settings: onshore, offshore, in warm climates and cold climates. If the ambient temperature rises, temperature of wind turbine components may also rise. If the ambient temperature is very high or remains high for a prolonged period of time, temperatures of wind turbine components may become too high and the operation of the wind turbine may need to be adapted to keep the temperatures of wind turbine components at acceptable levels.

Two different methods are known for dealing with such a situation. In one known solution, for different ambient temperatures, different maximum power setpoints (i.e. power limits) are defined. Such maximum power setpoints as a function of ambient temperatures may be fixed in contract between wind turbine manufacturers and operators.

In operation, the ambient temperature may be monitored and depending on the ambient temperature, the predefined maximum power setpoint is used. In particular this may mean that, above nominal wind speed, rated power is not delivered to the grid anymore, but rather a reduced amount of power is delivered. The operation of the wind turbine may be normal for lower wind speeds: even if a maximum power setpoint is determined based on ambient temperature, the prevailing wind conditions may be such that this maximum power cannot be reached even in optimum operation. One disadvantage of this approach is that the maximum power setpoint are generally set quite conservatively and this affects electrical power output.

In another known solution, temperatures of wind turbine components are measured during operation, and corresponding threshold values for wind turbine components are predefined. When the temperatures of the wind turbine components stays below the corresponding threshold, then the maximum power setpoint is not affected i.e. nominal rated power can be delivered to the grid if wind conditions are favorable. When one of the temperatures of the wind turbine components reaches a corresponding threshold, the power output is (generally) drastically reduced to cool the wind turbine components. One disadvantage of this approach is that power output, if reduced, generally needs to be reduced rapidly in order to guarantee safe operation of the components. Power output variations can thus be significant.

SUMMARY

In an aspect of the present disclosure, a method for determining a maximum power setpoint for a wind turbine is provided. The method comprises determining a temperature of a first wind turbine component, and determining a first component temperature error by determining a difference between the temperature of the first wind turbine component and a corresponding threshold temperature for the first wind turbine component. The method further comprises determining a present power output of the wind turbine and determining the maximum power setpoint at least partially based on the first component temperature error, and on the present power output of the wind turbine.

With a method according to this aspect, a maximum power setpoint is determined that is based on an actual temperature of a wind turbine components, rather than an ambient temperature. At the same time, setpoint reduction can be smoothened by reacting before an actual temperature limit for a component is reached. By monitoring a temperature error (i.e. a difference between a temperature objective or temperature limit and an actual temperature), the control will react before such a limit has been reached. The present power output may act like a predictor of future temperature development.

In a further aspect, a control system of a wind turbine is provided, which is configured to determine a first temperature of a wind turbine component, and to determine a present power output of the wind turbine. The control system is further configured to determine a component temperature error by determining a difference between the first temperature of the wind turbine component and a threshold temperature for the first wind turbine component and determine the maximum power setpoint at least partially based on the first component temperature error and the present power output. The control system is further configured to control the wind turbine based on the maximum power setpoint.

In yet a further aspect, a method for determining a maximum power setpoint for a wind turbine is provided, which comprises A method for determining a maximum power setpoint for a wind turbine comprising measuring a first temperature of a first electrical component of the wind turbine, and comparing the first temperature with a first temperature threshold established for the first electrical component to determine a first temperature error value. The method further comprises determining a present power output of the wind turbine and controlling a first power setpoint of the wind turbine including a first control based on the first temperature error value, and a second control based on the present power output of the wind turbine.

Throughout the present disclosure, nominal power or "rated power" is to be understood as the maximum power output according to standard operation of the wind turbine i.e. this nominal or rated power may be delivered to the grid at wind speeds at or above the nominal wind speed.

Throughout this disclosure, a maximum power setpoint is to be understood as the maximum power output of a wind turbine independent from prevailing wind conditions i.e. even if wind speeds are high enough such that more electrical power could be delivered to the grid, and particularly that the nominal rated power output could be delivered to the gird, the operation of the wind turbine is limited in such a manner to produce less electrical power than possible.

"Setpoint reduction" is to be understood as a wind turbine operation which is limited to produce and deliver to the grid less than the nominal or rated power. This operational limitation is not due to the prevailing wind conditions, but due to other circumstances. And within the present disclosure particularly, this operational limitation is due to temperatures or thermal limitations including predefined ambient and component temperatures and thermal limitations relating to either the ambient temperature or component temperatures.

DETAILED DESCRIPTION OF EXAMPLES

Figure 1:
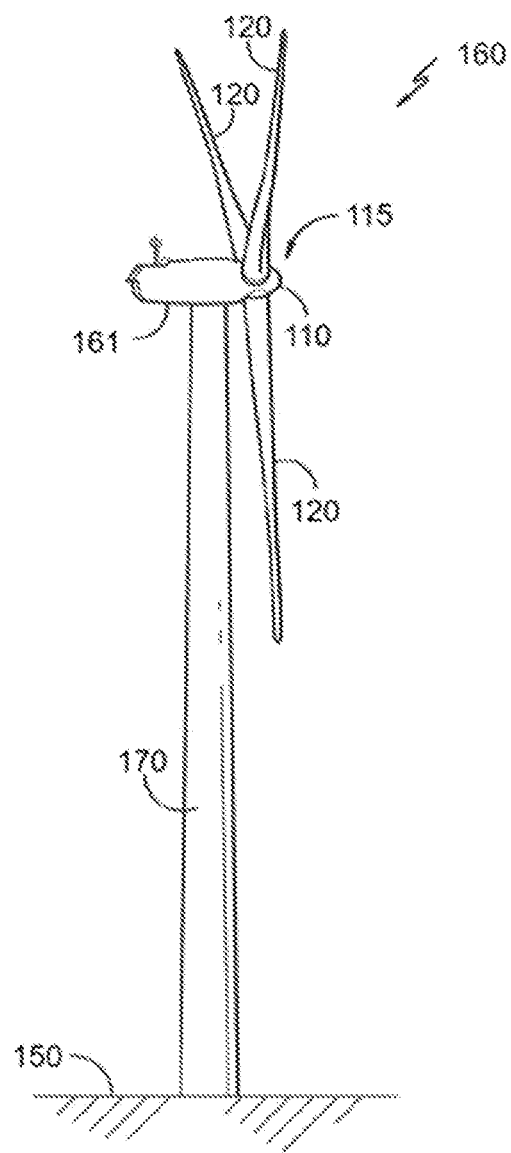
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
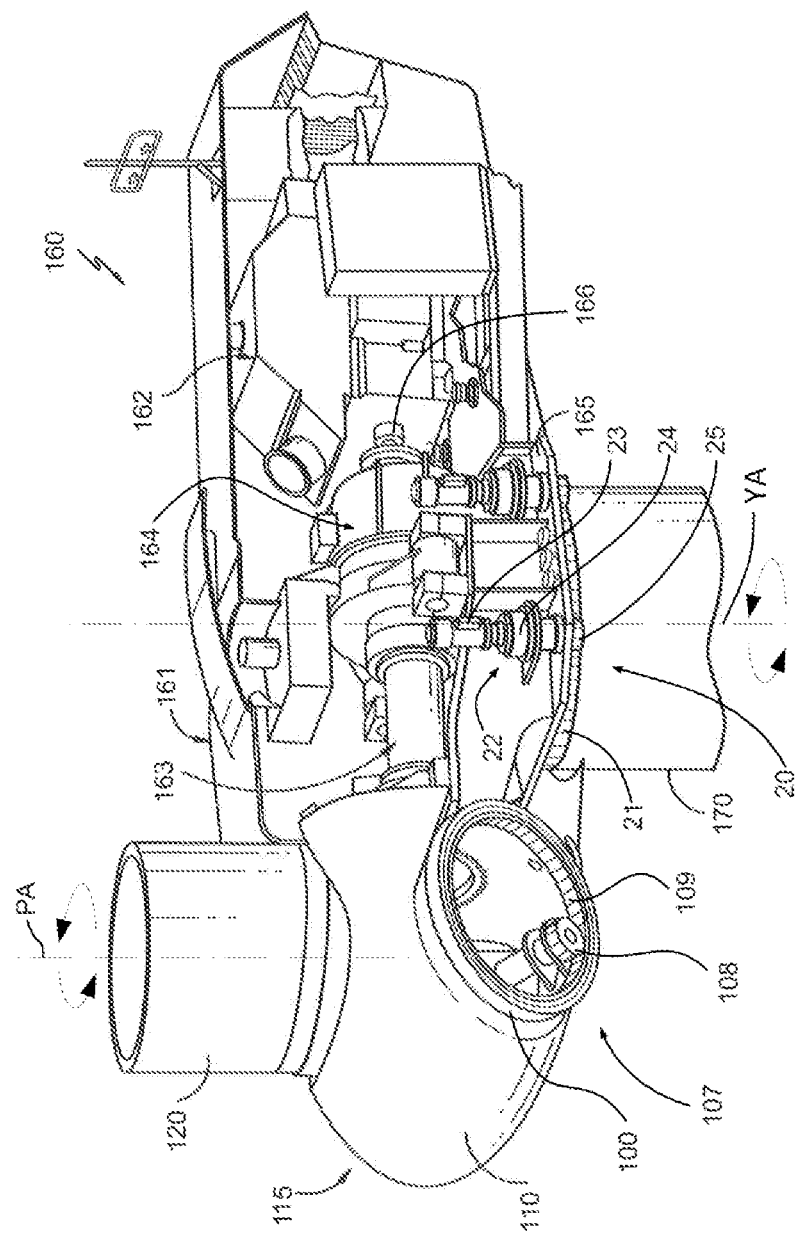
FIG. 2 illustrates a simplified, internal view of one example of the nacelle of the wind turbine of FIG. 1.

FIG. 2 illustrates a simplified, internal view of one example of the nacelle 161 of the wind turbine 160 of FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 may be rotatably coupled to the tower 170 through a yaw system 20 in such a way that the nacelle 161 is able to rotate about a yaw axis YA, or there may be other ways to position the rotor in the desired angle to the wind. If there is a yaw system 20, such system will usually comprise a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

As indicated above, blades 120 are coupled to the hub 110 by a pitch bearing 100 in between the blade 120 and the hub 110. The pitch bearing 100 comprises an inner ring 103 and an outer ring 104. A wind turbine blade may be attached either at the bearing inner ring or at the bearing outer ring, whereas the hub is connected at the other. A blade 120 may perform a relative rotational movement with respect to the hub 110 when a pitch system 107 is actuated. The inner bearing ring may therefore perform a rotational movement with respect to the outer bearing ring in FIG. 2. The pitch system 107 of FIG. 2 comprises a pinion 108 that meshes with an annular gear 109 provided on the inner bearing ring to set the wind turbine blade into rotation around a pitch axis PA.

Figure 3:
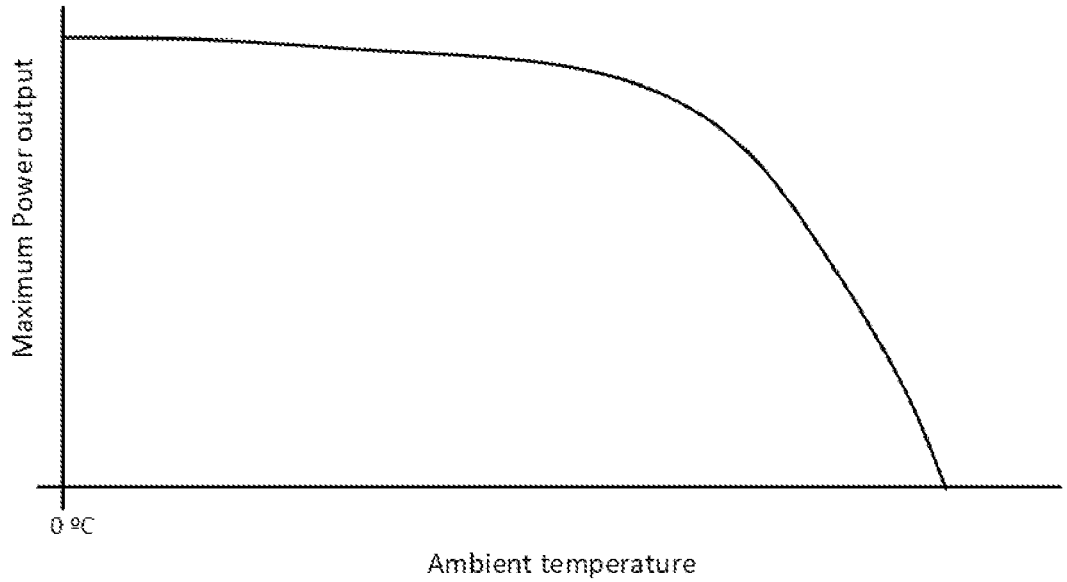
FIG. 3 schematically illustrates an example of a maximum power setpoint curve based on ambient temperatures.

FIG. 3 schematically illustrates an example of a maximum power setpoint curve based on ambient temperatures. For a variety of ambient temperatures, maximum power outputs are defined. Such a contract may be included in a contract between a wind turbine manufacturer and a wind turbine operator or client.

At relatively low ambient temperatures, the maximum power output may be the nominal power of the wind turbine. At lower ambient temperatures, there is no risk that component temperatures can reach their operational limits and thus no power curtailment is necessary.

At higher ambient temperatures, component temperatures may reach their operational limits, particularly if the wind turbine has been operating at its maximum capacity for a while. In order to protect the wind turbine components and to ensure safe operation, the power output of the wind turbine may be limited and the maximum power setpoint may be reduced.

However, there is no direct or linear relationship between ambient temperature and component temperatures. Particularly, component temperature may lag behind ambient temperature. Moreover, component temperature does not only depend on the ambient temperature, but also on a thermal history and inertia of the component, which in turn depend on the electrical power production in the recent operation of the wind turbine.

The present disclosure relates inter alia to a method for determining a maximum power setpoint for a wind turbine comprising determining a temperature of one or more wind turbine components. The method further comprises determining one or more component temperature errors by determining a difference between the temperatures of the wind turbine components and a corresponding threshold temperature for the components, and determining the maximum power setpoint at least partially based at least on the component temperature errors.

In particular, the one or more wind turbine components may include one or more electrical wind turbine components, or components or parts of electrical wind turbine components. Electrical components of the wind turbine may be more prone to overheating than other components, and their temperature depends at least partially on the electrical power output of the turbine. Their temperature can be controlled at least partially by controlling the wind turbine power output, and particularly by ensuring that the maximum power output is not (too) high.

Figure 4:
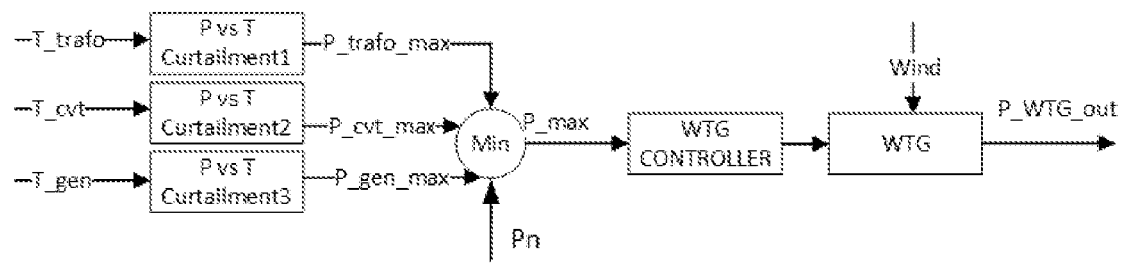
FIGS. 4 and 5 illustrate an example of method of determining a maximum power setpoint.
Figure 5:
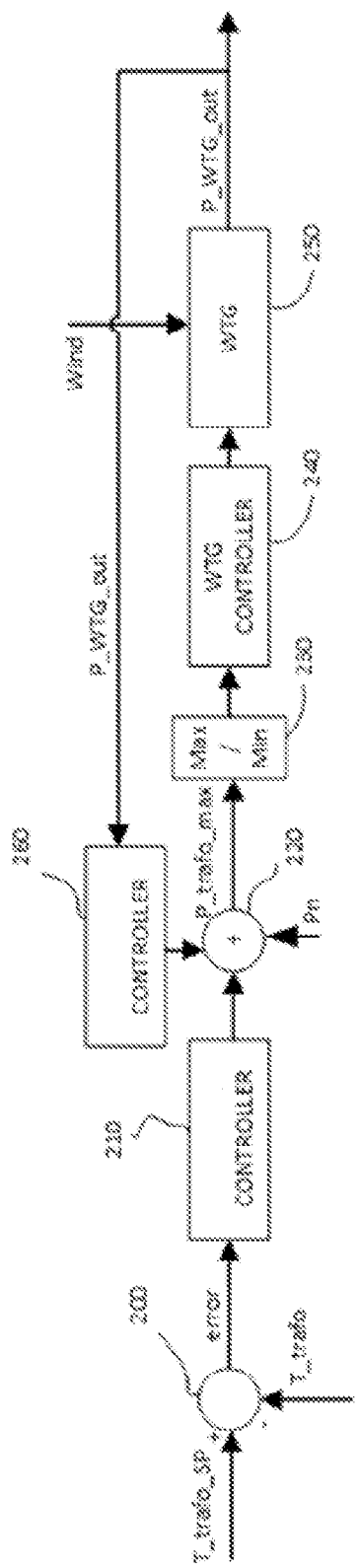

FIGS. 4 and 5 schematically illustrate an example of method of determining a maximum power setpoint. FIG. 5 schematically illustrates how a temperature error may be determined for a transformer, in particular a main transformer. A temperature of the transformer may be measured and compared to a temperature objective. The temperature objective may be a temperature threshold. The threshold may correspond to an operational limit of the component, and in this case, the transformer. In other examples, the temperature threshold may be set lower than the operational limit, e.g. a predetermined amount or predetermined percentage lower than an operational limit of the component.

By comparing, at 200, the actual temperature with the objective, a temperature error value is obtained. The error value may be used in a first control at block 210. If the error value is smaller, than the temperature of the component is closer to the threshold. The output of the first control may be a maximum power setpoint for the transformer. In FIG. 5, the output of the first control 210, may be a power setpoint increment, i.e. an amount of a decrease or increase of power setpoint.

At 220, increase or decrease of power setpoint is added to the nominal or rated power of the wind turbine. The outcome in the example of FIG. 5 is a power setpoint for the transformer, i.e. a maximum power setpoint determined based on the transformer temperature. It should be noted that the maximum power setpoint based on transformer temperature may be higher than the actual rated power of the wind turbine. This does not mean that the wind turbine will be operated at such a higher power setpoint, as will be explained herein.

Such methods may be carried out substantially continuously, e.g. every minute, or every 5-30 minutes, temperatures may be determined, and maximum power setpoints may be recalculated. The method may be carried out a constant frequency, or the frequency may be varied. E.g. the frequency of determining, measuring and/or calculating may increase as a temperature closer to a limit temperature is reached.

In some examples, determining the maximum power setpoint comprises a PID control based on the component temperature error. A proportional—integral— derivative controller (PID controller) is a control loop mechanism employing feedback. A PID controller continuously calculates an error value ("temperature error value" in this example) as the difference between a desired setpoint (temperature threshold) and a measured process variable (component temperature) and applies a correction based on proportional, integral, and derivative terms (denoted P, I, and D respectively).

PID control should not be understood herein that necessarily all three terms (proportional, integral and derivative) are used. In examples of the present disclosure, one or two of the terms may have a gains factor of zero, i.e. the PID control may be e.g. a PI control, or a PD control.

Alternatively, the first control herein embodied as a PID control may be embodied as any of Model Predictive Control (MPC), H-infinity methods, Linear-Quadratic (LQ) regulator. Further suitable algorithms for first control may also be used.

An output of the PID (or other first) control may be a power setpoint based on component temperature.

In examples, the maximum power setpoint may be determined as a rated power for the wind turbine if the power setpoint based on component temperature is higher than the rated power. The maximum power setpoint based on temperature of one or more of the components of the wind turbine may be implemented only if the calculated maximum power setpoint is lower than the nominal power, and not if the calculated maximum power setpoint is equal to or higher than the nominal power. Otherwise, the nominal power may be taken as the maximum power setpoint. In this case, wind turbine operation may be normal.

The temperature measurement and determination of a corresponding maximum power setpoint was shown to be applied to a transformer in FIG. 5. Similar measurements and determinations may be made for other wind turbine components, specifically electrical wind turbine components, and more specifically the generator of the wind turbine and the power converter, as illustrated in FIG. 4. For each of these components, corresponding maximum power setpoint based on their individual temperatures may be determined. In accordance with what is illustrated in FIG. 4, the most limiting power setpoint may be used for the control of the wind turbine, specifically if these are lower than the rated power of the wind turbine.

According to the example of FIG. 5, the methods for determining a maximum power setpoint further comprises determining a present power output of the wind turbine, and determining the maximum power setpoint based on the component temperature error and on the present power output. Power output of the wind turbine determines heat production in the different electrical components and may thus form input to help estimate future temperature of the electrical components.

In some examples, as illustrated in FIG. 5, a first offset power setpoint is determined based on the component temperature error (at first controller 210) and a second offset power setpoint is determined based on the present power output (at second controller 260).

In the example of FIG. 5, the maximum power setpoint is determined at 220, as a sum of a rated power of the wind turbine Pn, the first offset power setpoint and the second offset power setpoint. At block 230, the maximum power setpoint is fed to wind turbine controller 240 if the sum is less than the rated power of the wind turbine. If the sum is more than the rated power, then the rated power is delivered to the wind turbine controller 240.

At block 250, the wind turbine generator (WTG) is controlled based on the maximum power setpoint and the actual wind conditions. The result is the present power output of the wind turbine, which may be delivered to second controller 210.

Depending on the prevailing wind conditions, operation of the wind turbine may be standard. However, in particular at higher winds, the operation of the wind turbine may be adapted to reduce the power to the maximum power setpoint.

In the example of FIG. 5, a wind turbine transformer, and in particular the main wind turbine transformer, is shown as an example of an electrical component whose temperature condition can lead to a setpoint reduction and limit the wind turbine operation. In further examples, the method may be applied to other wind turbine components, particularly electrical components, and more particularly, a generator and/or a power converter.

Figure 6:
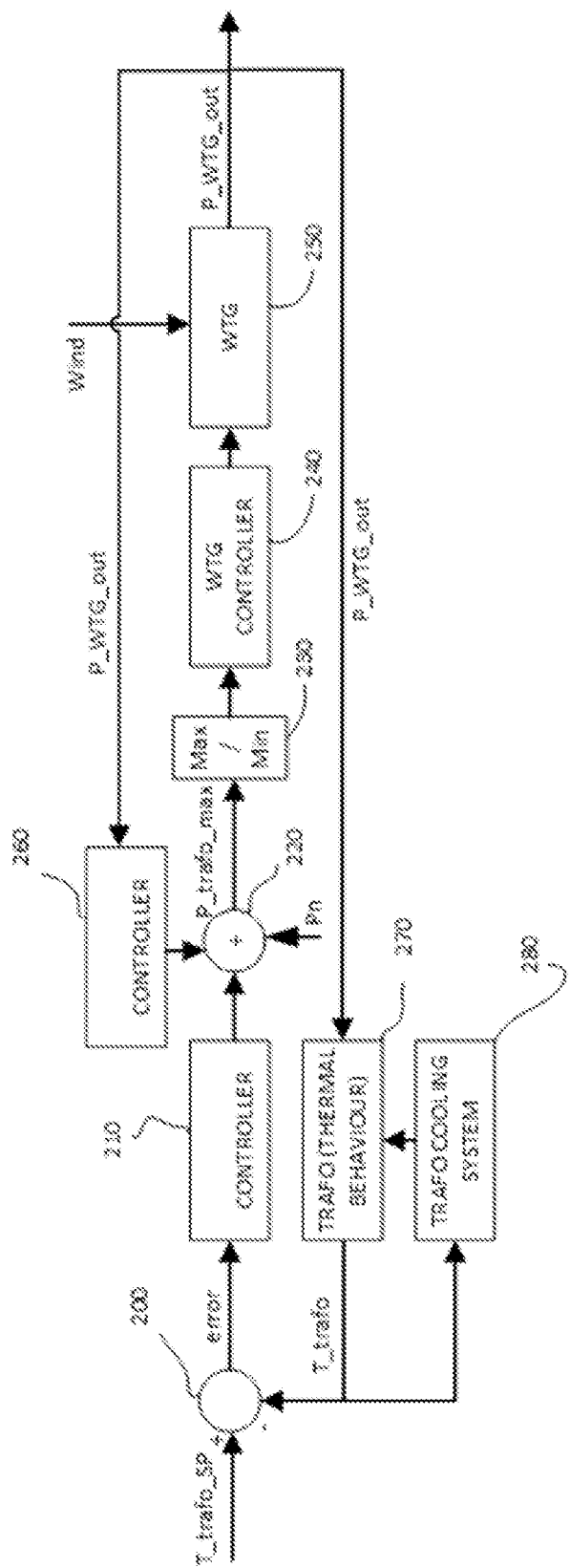
FIG. 6 schematically illustrates a further example of methods for determining maximum power setpoints.

A further example of a method for determining a maximum power setpoint is schematically illustrated in FIG. 6. The example of FIG. 6 largely corresponds to the example of FIG. 5, in that both a second control and a first control are incorporated. However, on the first side of the control, a number of elements have been added. It should be clear that these same or similar elements might be added in examples having only a first control as well.

As for the examples of FIG. 5, the temperature of the transformer may be measured or otherwise determined. The temperature of the transformer is used, at 210 to determine a transformer temperature error as before. This may form the basic input for a PID control as in the examples of FIG. 5.

A temperature measurement may be supplemented with information on the transformer's cooling system as well as on the transformer's operation as determined by the present power output of the wind turbine. A thermodynamic model may be used to complement actual temperature measurements. Input for the thermodynamic model includes information on the activity and characteristics of the cooling system and information on the present power output. The resulting transformer temperature may form input for determining the activity of the transformer cooling system, as illustrated in FIG. 6. In this example again, a wind turbine transformer was chosen as an example, but it will be clear that this teaching may be applied to or expanded to other electrical components, and their corresponding cooling systems as well.

In a further aspect, a control system for a wind turbine is provided which is configured to carry out any of the methods for determining a maximum power setpoint as herein disclosed. A control system of a wind turbine may be configured to determine a first temperature of a first wind turbine component, determine a first component temperature error by determining a difference between the first temperature of the wind turbine component and a threshold temperature for the first component. The control system may further be configured to determine a present power output and determine the maximum power setpoint at least partially based on the first component temperature error and the present power output. The control system may further be configured to control the wind turbine based on the maximum power setpoint.

The wind turbine component may be an electrical generator (rotor or stator or both), a power converter or an electrical transformer.

In examples, the wind turbine control system may include one or more sensors to determine the temperature(s) of the wind turbine component(s). In other examples, the wind turbine control system may receive temperature information through a wired or wireless connection.

In yet a further aspect, the present disclosure relates to a wind turbine comprising the wind turbine control system according to any of the examples disclosed herein.

In the examples illustrated so far, the focus has been on a single (electrical) wind turbine component. However, the method may be carried out for several different components simultaneously. Different components may prescribe different maximum power setpoints or setpoint reductions.

As illustrated in FIG. 4, taking into account the different maximum power setpoints as prescribed by different components such as the main wind turbine transformer, the wind turbine generator and the power converters (or specific parts of these components), a wind turbine setpoint reduction may be determined as the most limiting maximum power setpoint. An actual power setpoint reduction only occurs if one or more of the maximum power setpoint for different components is lower than the nominal power of the wind turbine.

As illustrated in FIG. 4, the resulting setpoint reduction may be fed to the wind turbine controller, which controls the operational settings of e.g. pitch system, generator torque. Other operational settings include e.g. the yaw angle. The actual operational settings do not only depend on the setpoint reduction but also on the prevailing wind conditions. In examples, a method may further comprise pitching the blades and/or reducing rotor speed in order to operate according to the setpoint reduction. By pitching the blades and reducing rotor speed, the power output may be reduced.

In accordance herewith, in yet a further aspect, a method for determining a maximum power setpoint for a wind turbine is provided. A method for determining a maximum power setpoint for a wind turbine comprising measuring a first temperature of a first electrical component of the wind turbine, and comparing the first temperature with a first temperature threshold established for the first electrical component to determine a first temperature error value. The method further comprises determining a present power output of the wind turbine and controlling a first power setpoint of the wind turbine including a first control based on the first temperature error value, and a second control based on the present power output of the wind turbine.

As in FIG. 4, the first electrical component may be a generator part.

In some examples, the method may further comprise measuring a second temperature of a second electrical component of the wind turbine, comparing the second temperature with a second temperature threshold established for the second electrical component to determine a second temperature error value and controlling a second power setpoint of the wind turbine including a first control based on the second temperature error value, and a second control based on the present power output of the wind turbine. A second electrical component may be e.g. a converter (part).

In some examples, the methods may further comprise determining the maximum power setpoint for the wind turbine to be the lower of a rated power of the wind turbine, the first power setpoint, and the second power setpoint.

In some examples, the methods may further comprise operating the wind turbine according to the maximum power setpoint, wherein the operating the wind turbine comprises pitching one or more blades of the wind turbine and/or reducing a rotor speed to operate according to the maximum power setpoint.

In some examples, the method may further comprise measuring a third temperature of a third electrical component of the wind turbine (e.g. the transformer). The method may further comprise comparing the third temperature with a third temperature threshold established for the third electrical component to determine a third temperature error value and determining a third power setpoint based on the third temperature error value. In this case, the method may further comprise determining the maximum power setpoint to be the lower of the rated power of the wind turbine, the first power setpoint, the second power setpoint and the third power setpoint.

As illustrated before, the method may further comprise determining a present power output of the wind turbine, and determining the first and second power setpoints based the first and second temperature error values respectively and on the present power output of the wind turbine.

Both the second control and the first control of the examples of FIGS. 6 and 7 may rely on PID algorithms. As mentioned before with respect to the example of FIG. 5, suitable alternative control algorithms include e.g. H-infinity, LQ, and MPC. The gains values for the PID (or other algorithms) for the second control and the first control for individual components may be different.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA), programmable logic controller (PLC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for determining a maximum power setpoint for a wind turbine comprising:
   determining a temperature of a first wind turbine component;
   determining a first component temperature error by determining an actual temperature difference between the temperature of the first wind turbine component and a corresponding threshold temperature for the first wind turbine component;
   determining a present power output of the wind turbine as an indication of present heat production in the wind turbine component and a future temperature of the wind turbine component; and
   wherein the determination of the maximum power setpoint is based at least partially on the first component temperature error and the present power output of the wind turbine.

2. The method of claim 1, wherein the component temperature error is used in a first control to determine a first offset power setpoint used in the determination of the maximum power setpoint.

3. The method of claim 2, wherein the maximum power setpoint is limited to a rated power for the wind turbine when a power setpoint based on the first component temperature error and on the present power output is higher than the rated power.

4. The method of claim 3, wherein the maximum power setpoint is set as the power setpoint when the power setpoint based on the first component temperature error and the present power output is lower than or equal to the rated power for the wind turbine.

5. The method of claim 2, wherein the present power output is used in a second control to determine a second offset power setpoint used in the determination of the maximum power setpoint.

6. The method of claim 5, wherein the maximum power setpoint is set as a sum of a rated power of the wind turbine, the first offset power setpoint, and the second offset power setpoint, when the sum is less than the rated power of the wind turbine.

7. The method of claim 5, wherein the maximum power setpoint is set as a sum of a present power output of the wind turbine, the first offset power setpoint, and the second offset power setpoint.

8. The method of claim 1, wherein the first wind turbine component is one of a generator, a main transformer, or a power converter.

9. The method of claim 1, further comprising operating the wind turbine according to the maximum power setpoint.

10. A control system of a wind turbine, the control system configured to perform operations comprising:
    determine a temperature of a first wind turbine component;
    determine a present power output of the wind turbine;
    determine a first component temperature error by determining an actual temperature difference between the temperature of the first wind turbine component and a threshold temperature for the first wind turbine component;
    determine a maximum power setpoint at least partially based on the first component temperature error and on the present power output, wherein the present power output is used as an indication of present heat production in the wind turbine component and future temperature of the wind turbine component; and
    control the wind turbine based on the maximum power setpoint.

11. The wind turbine control system of claim 10, wherein the wind turbine component is an electrical generator, a power converter, or an electrical transformer.

12. A wind turbine, comprising the wind turbine control system of claim 10.

13. The wind turbine of claim 12, comprising one or more sensors configured to determine the temperature of the first wind turbine component.

14. A method for determining a maximum power setpoint for a wind turbine comprising:
    measuring a first temperature of a first electrical component of the wind turbine;
    comparing the first temperature with a first temperature threshold established for the first electrical component to determine a first temperature error value corresponding to an actual temperature difference between the first temperature and the first temperature threshold;
    determining a present power output of the wind turbine;
    controlling a first power setpoint of the wind turbine with a first offset determined in a first control based on the first temperature error value, and a second offset determined in a second control based on the present power output of the wind turbine used as an indication of heat production in the first electrical component; and
    determining the maximum power setpoint for the wind turbine to be the lower of a rated power of the wind turbine or the first power setpoint.

15. The method of claim 14, further comprising
    measuring a second temperature of a second electrical component of the wind turbine;
    comparing the second temperature with a second temperature threshold established for the second electrical component to determine a second temperature error value corresponding to an actual temperature difference between the second temperature and the second temperature threshold;
    controlling a second power setpoint of the wind turbine with a second offset determined in a second control based on the second temperature error value, and a second offset determined in a second control based on the present power output of the wind turbine used as an indication of heat production in the first electrical component; and
    determining the maximum power setpoint for the wind turbine to be the lower of a rated power of the wind turbine, the first power setpoint, or the second power setpoint.

16. The method of claim 14, further comprising operating the wind turbine according to the maximum power setpoint by pitching one or more blades of the wind turbine or reducing a rotor speed to operate according to the maximum power setpoint.

17. The method of claim 14, wherein the first wind turbine component is a part of a generator, and the second wind turbine component is a part of a converter or a part of a transformer.

* * * * *